US012005763B2

(12) United States Patent
Toyota et al.

(10) Patent No.: US 12,005,763 B2
(45) Date of Patent: Jun. 11, 2024

(54) VEHICLE

(71) Applicant: TOYOTA JIDOSHA KABUSHIKI KAISHA, Toyota (JP)

(72) Inventors: Masaru Toyota, Toyota (JP); Sho Tsumita, Seto (JP); Yoshiyuki Ryuno, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 492 days.

(21) Appl. No.: 17/333,646

(22) Filed: May 28, 2021

(65) Prior Publication Data
US 2022/0024287 A1    Jan. 27, 2022

(30) Foreign Application Priority Data

Jul. 21, 2020 (JP) ................. 2020-124677

(51) Int. Cl.
*B60J 5/04*     (2006.01)
*B60J 10/27*    (2016.01)

(52) U.S. Cl.
CPC ........... *B60J 5/0463* (2013.01); *B60J 5/0402* (2013.01); *B60J 5/0408* (2013.01); *B60J 5/0412* (2013.01); *B60J 10/27* (2016.02)

(58) Field of Classification Search
CPC ...... B60J 5/0463; B60J 5/0402; B60J 5/0408; B60J 5/0412; B60J 10/27; B60J 1/17; B60J 1/2097; B60J 10/74; E05F 11/382
USPC ................. 296/152, 93, 146.1, 146.16, 146.2
See application file for complete search history.

(56) References Cited

U.S. PATENT DOCUMENTS

| | | | | |
|---|---|---|---|---|
| 1,684,636 A | * | 9/1928 | Mendenhall | B60J 1/2097 292/DIG. 72 |
| 2,145,659 A | * | 1/1939 | Lane | E05F 11/382 49/350 |
| 2,542,906 A | * | 2/1951 | Cromwell | B60J 10/75 49/440 |
| 2,565,232 A | * | 8/1951 | Hezler, Jr. | E05F 11/382 49/350 |
| 2,721,636 A | * | 10/1955 | Ordorica | B60J 10/74 49/408 |

(Continued)

FOREIGN PATENT DOCUMENTS

JP    54-150222 U    4/1979
JP    62-56669 U     4/1987

(Continued)

*Primary Examiner* — Pinel E Romain
(74) *Attorney, Agent, or Firm* — Sughrue Mion, PLLC

(57) ABSTRACT

A vehicle may include a vehicle body, a door, a window frame, a window panel, a lower support and an anti-vibration member. The window panel may be provided in the window frame, configured to be manually raised and lowered, and supported to movable between an upper limit position where the window panel closes an opening of the window frame and a lower limit position where the window panel opens the opening of the window frame. The lower support may include a groove. The groove may be configured to receive a lower edge of the window panel when the window panel is located at the lower limit position. The anti-vibration member may have viscoelasticity, disposed in the groove of the lower support, and configured to hold the window panel from both sides of the window panel.

15 Claims, 4 Drawing Sheets

(56) References Cited

U.S. PATENT DOCUMENTS

| | | | | |
|---|---|---|---|---|
| 4,119,341 A * | 10/1978 | Cook | ............. | E05F 15/689 |
| | | | | 296/146.16 |
| 4,621,453 A * | 11/1986 | Watanabe | ............. | B60J 10/79 |
| | | | | 49/374 |
| 5,199,217 A * | 4/1993 | Roze | ............. | B60J 1/17 |
| | | | | 49/375 |
| 5,907,927 A * | 6/1999 | Lieb | ............. | B60J 1/17 |
| | | | | 49/375 |
| 6,330,764 B1 * | 12/2001 | Klosterman | ............. | E05F 11/385 |
| | | | | 49/506 |
| 6,412,226 B1 * | 7/2002 | Nozaki | ............. | B60J 10/74 |
| | | | | 49/377 |
| 8,727,419 B2 * | 5/2014 | Syvret | ............. | E05F 11/486 |
| | | | | 296/146.2 |
| 9,925,850 B2 * | 3/2018 | Yoshida | ............. | B60J 10/79 |
| 2019/0176581 A1 * | 6/2019 | Abe | ............. | B60J 1/2086 |
| 2019/0225060 A1 * | 7/2019 | Sannohe | ............. | B60J 10/74 |

FOREIGN PATENT DOCUMENTS

| | | |
|---|---|---|
| JP | 6-42337 U | 6/1994 |
| JP | 2000-6659 A | 1/2000 |
| JP | 2004-75067 A | 3/2004 |
| JP | 2007-030706 A | 2/2007 |
| JP | 2011-20612 A | 2/2011 |
| JP | 2012-140832 A | 7/2012 |

* cited by examiner

VEHICLE

CROSS-REFERENCE TO RELATED APPLICATION

This application claims priority to Japanese Patent Application No. 2020-124677, filed on Jul. 21, 2020, the entire contents of which are incorporated herein by reference.

TECHNICAL FIELD

The art disclosed herein relates to a vehicle.

BACKGROUND

Japanese Patent Application Publication No. 2007-30706 describes a single-passenger compact vehicle. In this vehicle, a main body of a door is constituted of synthetic resin, by which weigh reduction is achieved in the vehicle.

SUMMARY

In general vehicles, a window panel provided in a door is opened and closed by an elevating device. The elevating device for the window panel is arranged inside the door and includes a mechanism configured to move the window panel in an up-down direction in accordance with an operation of a motor or manipulation by a user. Contrary to this, in a single-passenger compact vehicle as the one described above, a window panel configured to be manually raised and lowered may be employed. A window panel configured to be manually raised and lowered refers to a window panel that is configured to be manipulated in the up-down direction directly by the user without intervention of an elevating device. For example, employing the window panel configured to be manually raised and lowered reduces the weight of the vehicle since the aforementioned elevating device is not necessary. The window panel configured to be manually raised and lowered is not limited to being employed in a window frame provided in a door, but it may be employed in a window frame provided in a vehicle body.

The window panel configured to be manually raised and lowered is movable between an upper limit position where the window panel closes an opening of the window frame and a lower limit position where the window panel opens the opening of the window frame. At the upper limit position, the window panel may be locked with respect to the window frame to avoid the window panel dropping under its own weight. On the other hand, at the lower limit position, the window panel may not necessarily be locked with respect to the window frame since the position of the window panel is maintained under its own weight. However, when the widow panel is not locked, the window panel may tend to vibrate while the vehicle is traveling.

In view of the above, the disclosure herein provides art that reduces vibration of a window panel at a lower limit position in a vehicle that employs the window panel configured to be manually raised and lowered.

A vehicle disclosed herein may comprise a vehicle body; a door provided on the vehicle body and configured to be opened and closed with respect to the vehicle body; a window frame provided in the vehicle body or the door; a window panel provided in the window frame, configured to be manually raised and lowered, and supported to be movable between an upper limit position where the window panel closes an opening of the window frame and a lower limit position where the window panel opens the opening of the window frame; a lower support comprising a groove, the groove being configured to receive a lower edge of the window panel when the window panel is located at the lower limit position; and an anti-vibration member having viscoelasticity, disposed in the groove of the lower support, and configured to hold the window panel from both sides of the window panel. The window panel configured to be manually raised and lowered refers to a window panel that is manipulated directly by a user in an up-down direction without intervention of a mechanism such as an elevating device.

In the vehicle described above, the window panel configured to be manually raised and lowered is employed in the window frame provided in the door or the vehicle body. This window panel is configured to be directly manipulated by a user in an up-down direction between the upper limit position where the window panel closes the opening of the window frame and the lower limit position where the window panel opens the opening of the window frame. When the window panel is at the lower limit position, the lower edge of the window panel is housed within the groove of the lower support. The position of the window panel is thereby stabilized. Further, the anti-vibration member that holds the window panel from both sides thereof is disposed in the groove of the lower support. Thereby, vibration of the window panel can be reduced, for example, while the vehicle is traveling.

DETAILED DESCRIPTION

Figure 1:
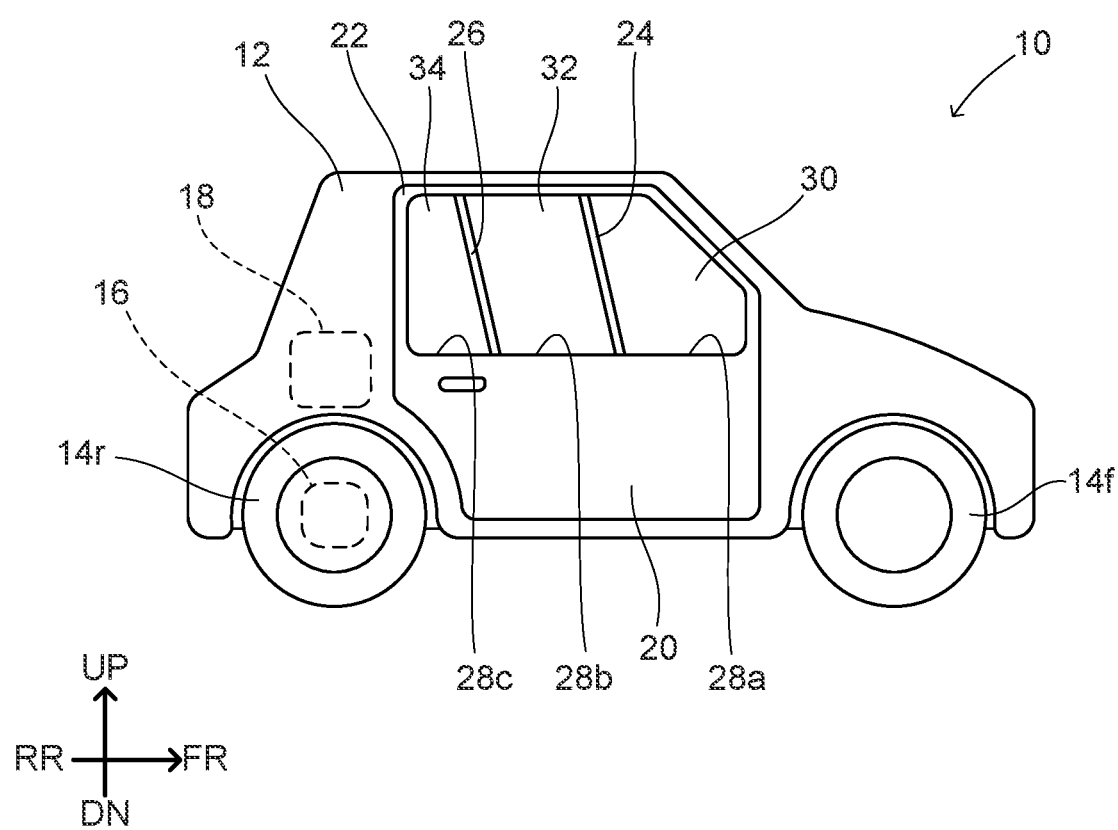
FIG. 1 is a schematic side view of an entirety of a vehicle 10 and primarily shows a right side surface of the vehicle 10.

In an embodiment of the disclosure herein, an anti-vibration member may include a first lip abutting one surface of a window panel and a second lip abutting another surface of the window panel. In this case, the first lip and the second lip may extend in parallel with each other along a longitudinal direction of a groove of a lower support. In such a configuration, the anti-vibration member contacts a lower edge of the window panel over an elongated range, and thus vibration of the window panel can be effectively reduced.

In the above embodiment, the first lip may be provided with a first guide surface which inclines downward toward the second lip and the second lip may be provided with a second guide surface which inclines downward toward the first lip. Such a configuration can guide, when the window panel is moved toward the lower limit position, the lower edge of the window panel into a space between the two lips by the guide surfaces.

In addition to or instead of the above, the first lip may cover a first upper surface of the lower support that is located on one side of the groove and the second lip may cover a second upper surface of the lower support that is located on another side of the groove. Such a configuration prohibits, when the window panel is moved toward the lower limit position, the lower edge of the window panel from contacting the upper surfaces of the lower support.

In an embodiment of the disclosure herein, at least a part of the anti-vibration member may be constituted of a rubber material. The rubber material is one of materials having suitable viscoelasticity to reduce the vibration of the window panel. The rubber material may be natural rubber or synthetic rubber. The rubber material herein includes those called elastomers.

In an embodiment of the disclosure herein, the window frame may be provided in the door. With such a configuration, when the door is opened or closed with the window panel positioned at the lower limit position, the window panel can be stably supported by the lower support and the anti-vibration member. However, the window frame is not limited to being provided in the door and may be provided in a vehicle body. In this case, the window frame is not limited to being provided in an outer surface of the vehicle body but it may be provided inside the vehicle body, and the window panel may be a partition between two seats.

In the above embodiment, a pair of guide rails which slidably supports a pair of side edges of the window panel may be provided inside the door. With such a configuration, the window panel at the lower limit position can be more stably supported when the door is opened or closed.

In an embodiment of the disclosure herein, a knob configured to be gripped by a user may be provided on the window panel. Such a configuration facilitates the user to manipulate the window panel using the knob. However, the knob is not mandatory. In another embodiment, a recess in which the user can insert a finger may be directly provided in the window panel.

In the above embodiment, the knob may be provided with a movable hook configured to be manipulated by the user. In this case, the window frame may be provided with a hook receiver configured to engage with the hook to lock the window panel when the window panel is located at the upper limit position. This configuration may lock the window panel at the upper limit position such that the window panel does not drop.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved vehicles, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

A vehicle 10 according to an embedment will be described with reference to the drawings. The vehicle 10 according to the present embodiment is a so-called automobile and travels on a road. In the drawings, a direction FR indicates the front in a front-rear direction (longitudinal direction) of the vehicle 10 and a direction RR indicates the rear in the front-rear direction of the vehicle 10. Further, a direction LH indicates the left in a left-right direction (width direction) of the vehicle 10 and a direction RH indicates the right in the left-right direction of the vehicle 10. Further, a direction UP indicates up in an up-down direction (height direction) of the vehicle 10 and a direction DN indicates down in the up-down direction of the vehicle 10. In the disclosure herein, the front-rear direction, the left right direction, and the up-down direction of the vehicle 10 may simply be termed the front-rear direction, the left-right direction, and the up-down direction, respectively.

As shown in FIG. 1, the vehicle 10 includes a vehicle body 12 and a plurality of wheels 14$f$, 14$r$. Although not particularly limited, the vehicle body 13 is constituted using a metal material and a resin material. The plurality of wheels 14$f$, 14$r$ is attached rotatably with respect to the vehicle body 12. The plurality of wheels 14$f$, 14$r$ includes a pair of front wheels 14$f$ and a pair of rear wheels 14$r$. The number of the wheels 14$f$ and 14$r$ is not limited to four. The vehicle 10 according to the present embodiment has a compact size for a single passenger, however, no limitations are placed on the size of the vehicle 10 and the number of passengers the vehicle 10 accommodates.

The vehicle 10 further includes a traction motor 16 and a battery unit 18. The traction motor 16 is connected to the pair of rear wheels 14$r$ and is configured to drive the pair of rear wheels 14$r$. The traction motor 16 is not limited to driving the pair of rear wheels 14$r$ and may be configured to drive at least one of the plurality of wheels 14$f$, 14$r$. The battery unit 18 is connected to the traction motor 16 via a power supply circuit (not shown) and is configured to supply electric power to the traction motor 16. The battery unit 18 includes a plurality of secondary battery cells and is repeatedly rechargeable with external electric power. The vehicle 10 may include another power source such as a fuel cell unit or a solar power panel in addition to or as an alternative to the battery unit 18. Further, the vehicle 10 may include another prime mover such as an engine in addition to or as an alternative to the traction motor 16.

The vehicle 10 further includes a door 20. The door 20 is on the right side of the vehicle body 13 and is configured to be opened and closed with respect to the vehicle body 12. The door 20 is provided for a user to get into and get out of the vehicle 10. The door 20 is attached to the vehicle body 12 via a hinge (not shown) and is swingable in a horizontal direction. A window frame 22 is provided in the door 20. The window frame 22 is located in an upper portion of the door 20. Two bars 24 and 26 are provided within the window frame 22. The two bars 24 and 26 are parallel to each other and extend substantially in the up-down direction. The window frame 22 and the two bars 24 and 26 define three window openings 28$a$, 28$b$, and 28$c$. The position of the door 20 may be on the left side of the vehicle body 12. The position of the door 20 may be designed in accordance with national or regional regulations.

The three window openings 28a, 28b, and 28c include a first window opening 28a, a second window opening 28b, and a third window opening 28c. The first window opening 28a is located forward of the second window opening 28b and the third window opening 28c and is surrounded by the window frame 22 and one bar 24. A first window panel 30 is provided in the first window opening 28a. The first window panel 30 cannot be opened nor closed and is fixed to the window frame 22 and the one bar 24. The second window opening 28b is located in the middle and is surrounded by the window frame 22 and the two bars 24, 26. A second window panel 32 is provided in the second window opening 28b. The second window panel 32 can be opened and closed and is attached such that it is movable in the up-down direction between the two bars 24 and 26. A third window panel 34 is provided in the third window opening 28c. The third window panel 34 cannot be opened nor closed and is fixed to the window frame 22 and the other bar 26. Here, each of the window panels 30, 32, and 34 is not limited to being constituted of glass, but they may be constituted of another transparent or semitransparent material such as acrylic resin.

The second window panel 32 is configured to be manually raised and lowered. A window panel configured to be manually raised and lowered refers to a window panel that is manipulated directly by a user in the up-down direction without intervention of a mechanism such as a conventional elevating device. Hereinbelow, the second window panel 32 and configurations related thereto will be described in detail with reference to FIGS. 2 to 5. In the following description, the second window opening 28b may simply be termed the window opening 28b and the second window panel 32 may simply be termed the window panel 32.

Figure 2:
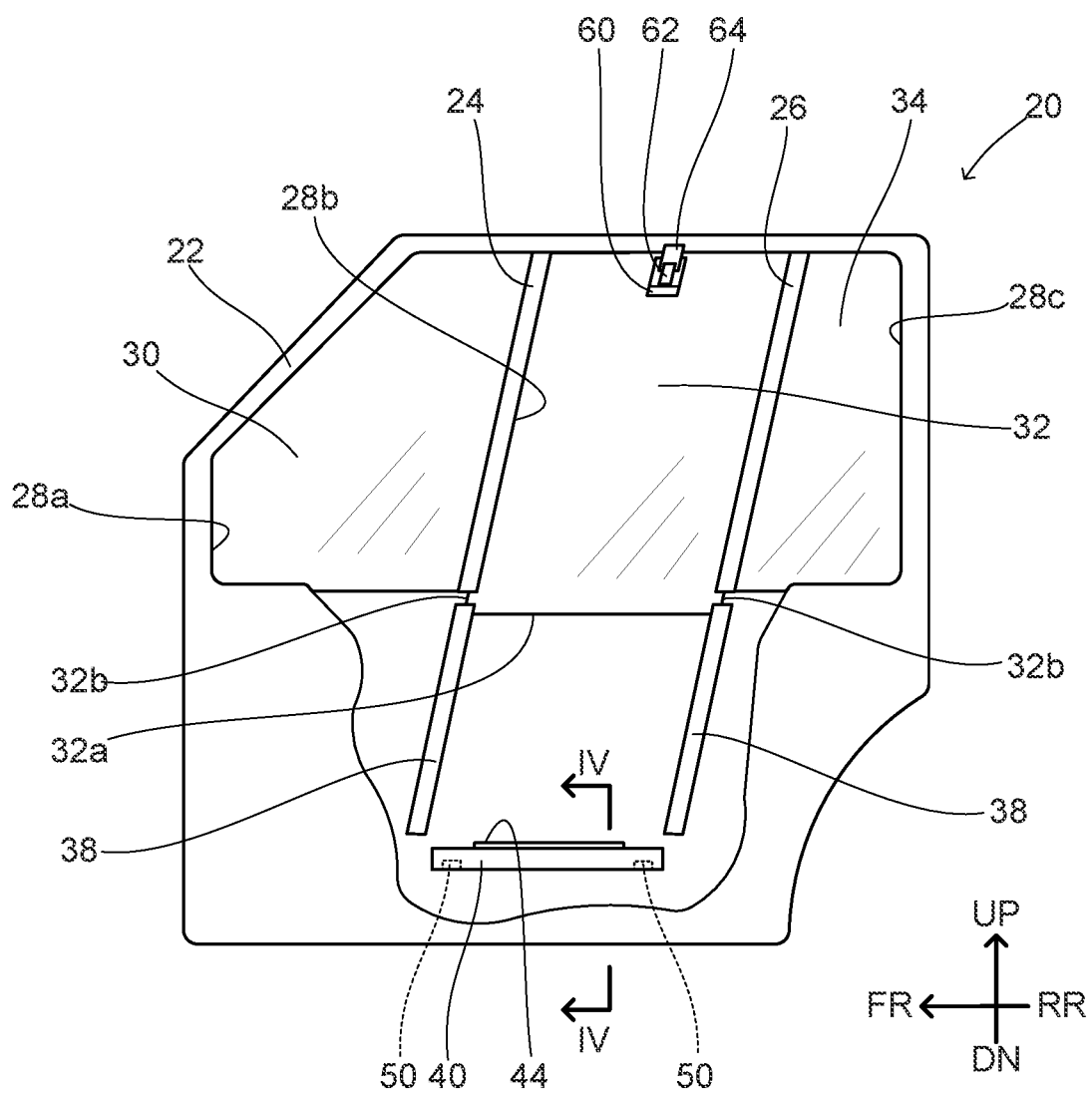
FIG. 2 shows a door 20 and its interior structure seen from within the vehicle 10 (that is, from within a cabin), where a window panel 32 is at an upper limit position.
Figure 3:
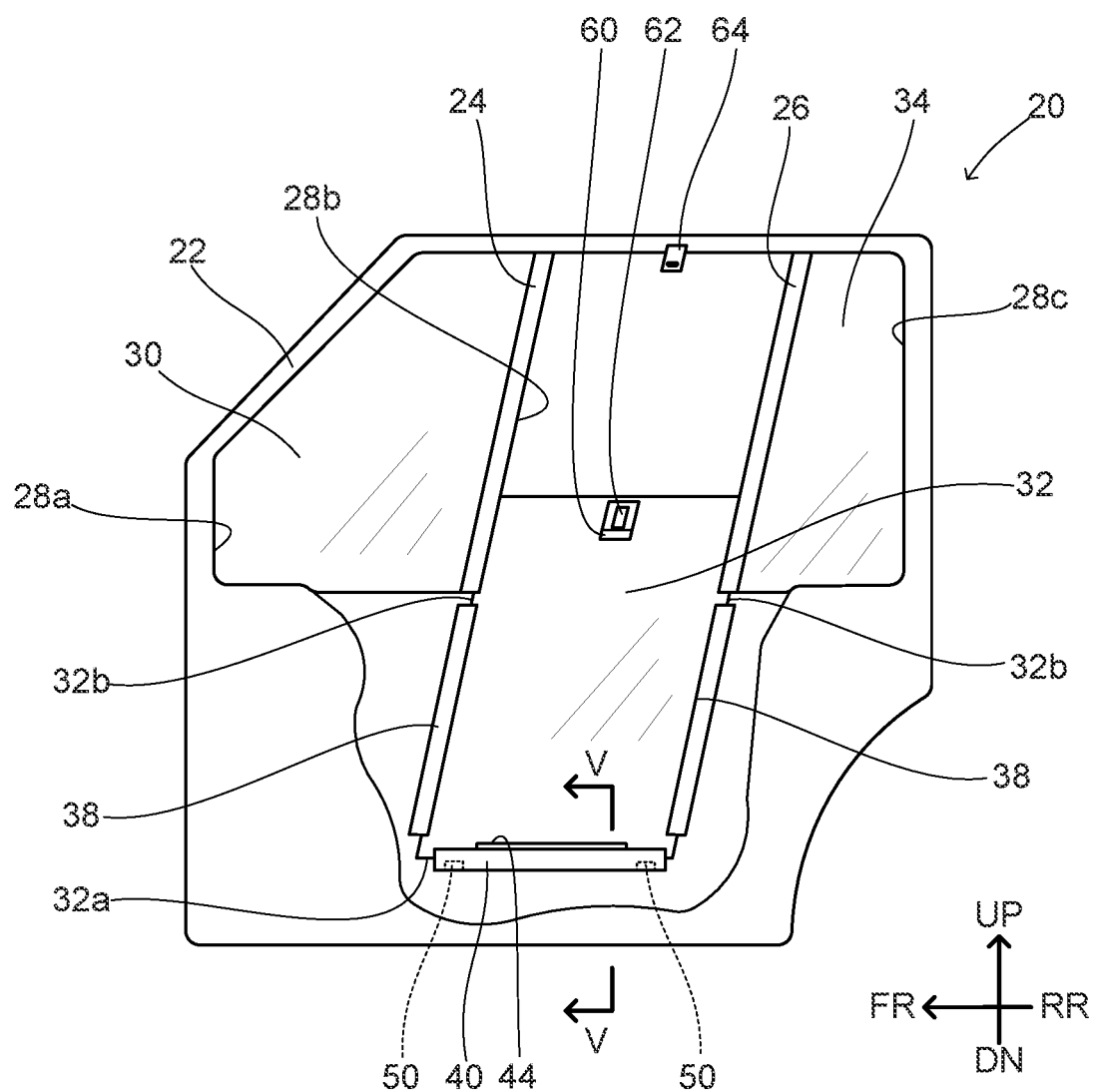
FIG. 3 shows the door 20 and its interior structure seen from within the vehicle 10 (that is, from within the cabin), where the window panel 32 is at a lower limit position.
Figure 4:
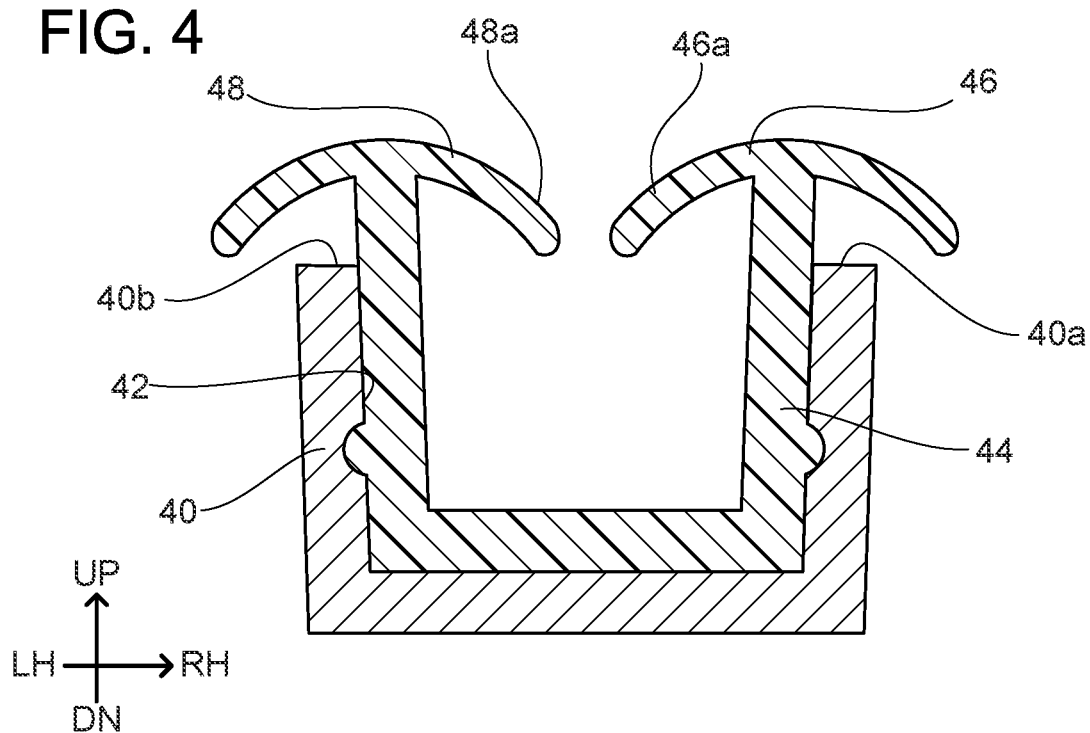
FIG. 4 shows a cross-sectional view, along a line IV-IV in FIG. 2 and especially shows a lower support 40 and an anti-vibration member 44.

As shown in FIGS. 2 and 3, the window panel 32 is directly manipulated by the user in the up-down direction between an upper limit position where the window panel 32 closes the window opening 28b and a lower limit position where the window panel 32 opens the window opening 28b. Side edges 32b of the window panel 32 are slidably supported by the two bars 24 and 26. Further, a pair of rails 38 that supports the side edges 32b of the window panel 32 such that the side edges 32b are slidable is also provided inside the door 20. A knob 60 configured to be gripped by the user is provided on the window panel 32. The knob 60 is attached to an inner surface of the window panel 32 and protrudes from the inner surface of the window panel 32. The user can easily manipulate the window panel 32 by using the knob 60. That is, the user can raise and lower the window panel 32 by gripping the knob 60.

The knob 60 includes a movable hook 62 configured to be manipulated by the user. The window frame 22 includes a hook receiver 64 corresponding to the hook 62. The hook receiver 64 engages with the hook 62 when the window and 32 is at the upper limit position. The window panel 32 at the upper limit position is thereby locked such that it does not drop under its own weight, for example. The positions of the knob 60, the hook 62, and the hook receiver 64 are not particularly limited. For example, the knob 60 and the hook 62 may be at different positions from each other. Alternatively, the hook 62 may be provided on the window frame 22 and the hook receiver 64 may be provided on the window panel 32.

As shown in FIGS. 2 to 5, a lower support 40 and an anti-vibration member 44 are provided inside the door 20, The lower support 40 is an elongated member extending in the front-rear direction and is constituted of a resin material. However, the material constituting the lower support 40 is not particularly limited. The lower support 40 includes a groove 42 extending in a longitudinal direction of the lower support 40, hats, in the front-rear direction of the vehicle 10. The groove 42 is open upward and is configured to receive a lower edge 32a of the window panel 32 when the window panel 32 is at the lower limit position, Thereby, the window panel 32 at the lower limit position is stably supported by the pair of rails 38 and the lower support 40. A plurality of stoppers 50 is provided in the groove 42 of the lower support 40. Each of the stoppers 50 is configured to abut the lower edge 32a of the window panel 32 when the window panel 32 is at the lower limit position. Although not particularly limited, the stoppers 50 are constituted of a material having viscoelasticity such as a rubber material.

The anti-vibration member 44 is disposed in the groove 42 of the lower support 40. The anti-vibration member 44 is constituted of a rubber material and has viscoelasticity. This rubber material may be natural rubber, synthetic rubber, or a combination thereof. The material constituting the anti-vibration member 44 is not limited to the rubber material. At least a part of the anti-vibration member 44 may be constituted of a material having viscoelasticity. In this case, the material constituting the anti-vibration member 44 may be more flexible (that is, have lower rigidity) than the material constituting the window panel 32. Further, the material constituting the anti-vibration member 44 may be more flexible than the material constituting the lower support 40. In other words, the lower support 40 may be constituted of, for example, a material having higher rigidity than the window panel 32, and thereby the window panel 32 is firmly supported. When the window panel 32 is supported by the lower support 40, the window panel 32 is prohibited from directly contacting the lower support 40 by the anti-vibration member 44 being interposed between the lower support 40 and the window panel 32. Thus, even when the lower support 40 has relatively high rigidity, damage to the window panel 32 can be avoided.

The anti-vibration member 44 includes a first lip 46 and a second lip 48. The first lip 46 is configured to abut one surface 32x (outer surface) of the window panel 32 and the second lip 48 is configured to abut another surface 32y of the window panel 32. Thus, the anti-vibration member 44 is configured to hold the window panel 32 at the lower limit position on the both surfaces 32x and 32y, Thereby, vibration of the window panel 32 can be reduced while the vehicle 10 is traveling or when the door 20 is opened or closed, for example. The shape of the anti-vibration member 44 in the present embodiment is a mere example. The specific shape of the anti-vibration member 44 is not particularly limited. The anti-vibration member 44 according to the present embodiment has an identical cross-sectional shape along its longitudinal direction (that is, along the front-rear direction). However, in another embodiment, the cross-sectional shape of the anti-vibration member 44 may be varied continuously or intermittently along the longitudinal direction of the anti-vibration member 44.

The first lip 46 and the second lip 48 extend in parallel with each other along a longitudinal direction of the grove 42 of the lower support 40 (that is, along the front-rear direction). In such a configuration, the anti-vibration member 44 contacts the lower edge 32a of the window panel 32 over an elongated range, and thus vibration of the window panel 32 is effectively reduced. Alternatively, the first lip 46 and the second lip 48 may be provided intermittently along the longitudinal direction of the groove 42. Further, the first lip 46 and the second lip 48 are not necessarily adjacent to each other, and they may be provided alternately along the longitudinal direction of the groove 42. Although not particularly limited, the lips 46 and 48 according to the present embodiment each have a curved, thin plate-like shape, and thus they have a curved, thin plate-like shape that exhibits excellent elasticity. Here, the thin plate-like shape refers to a plate-like shape with a thickness of 3 mm or less. Further, the first lip 46 and the second lip 48 may be bilaterally symmetrical or be asymmetric.

The first lip 46 is provided with a first guide surface 46a. The first guide surface 46a is a part of upper surface of the first lip 46 and inclines downward toward the adjacent second lip 48. Similarly, the second lip 48 is provided with a second guide surface 48a. The second guide surface 48a is a part of upper surface of the second lip 48 and inclines downward toward the adjacent first lip 46. Such a configuration can guide, when the window panel 32 is moved toward the lower limit position, the lower edge 32a of the window panel 32 into a space between the two lips 46 and 48 by these guide surfaces 46a and 48a.

Figure 5:
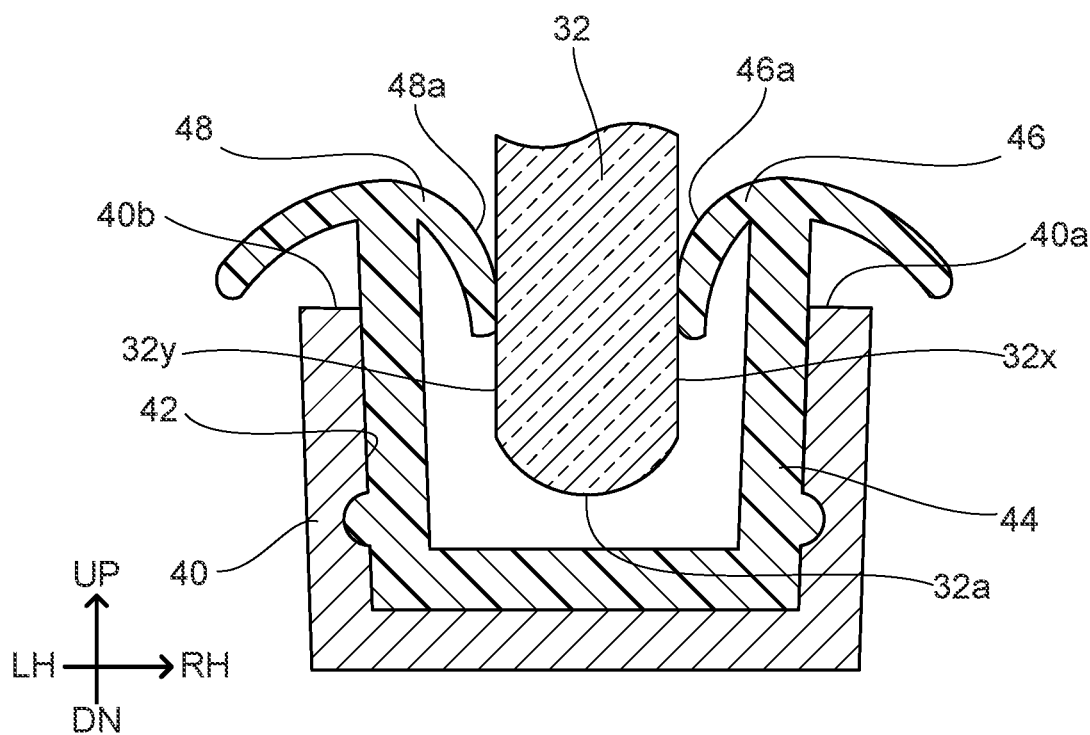
FIG. 5 shows a cross-sectional view along a line V-V in FIG. 3 and especially shows the lower support 40, the anti-vibration member 44, and the window panel 32.

Additionally, as shown in FIG. 5, the lower edge 32a of the window panel 32 is curved to protrude downward in a thickness direction of the window panel 32. Here, the thickness direction of the window panel 32 matches the left-right direction of the vehicle 10, and thus it matches a direction along which the two lips 46 and 48 of the anti-vibration member 44 are adjacent to each other. Thus, a range of the lower edge 32a of the window panel 32 that abuts the guide surface 46a of the first lip 46 (that is, an outer half of the lower edge 32a) is inclined to correspond to the guide surface 46a. Similarly, a range of the lower edge 32a of the window panel 32 that abuts the guide surface 48a of the second lip 48 (that is, an inner half of the lower edge 32a) is inclined to correspond to the guide surface 48a. Thereby, when the window panel 32 is moved toward the lower limit position, the lower edge 32a of the window panel 32 is smoothly guided into the space between the two lips 46 and 48.

The first lip 46 covers a first upper surface 40a of the lower support 40 that is located on one side (right side) of the groove 42. The second lip 48 covers a second upper surface 40b of the lower support 40 that is located on another side (left side) of the groove 42. With such a configuration, when the window panel 32 is moved toward the lower limit position, the lower edge 32a of the window panel 32 is prohibited from contacting the upper matinees 40a and 40b of the lower support 40. Thus, even when the window panel 32 is manipulated with a great force or when the window panel 32 drops under its own weight, for example, damage to the window panel 32 can be avoided.

What is claimed is:

1. A vehicle, comprising:
a vehicle body;
a door provided on the vehicle body and configured to be opened and closed with respect to the vehicle body;
a window frame provided in the vehicle body or the door;
a window panel provided in the window frame, configured to be manually raised and lowered, and supported to be movable between an upper limit position where the window panel closes an opening of the window frame and a lower limit position where the window panel opens the opening of the window frame;
a lower support fixed to the vehicle body or the door and comprising a groove, the groove being configured to receive a lower edge of the window panel when the window panel is located at the lower limit position and release the lower edge of the window panel when the window panel moves from the lower limit position; and
an anti-vibration member having viscoelasticity, disposed in the groove of the lower support, and configured to hold the window panel from both sides of the window panel.

2. The vehicle according to claim 1, wherein
the anti-vibration member includes a first lip abutting one surface of the window panel and a second lip abutting another surface of the window panel, and
the first lip and the second lip extend in parallel with each other along a longitudinal direction of the groove of the lower support.

3. The vehicle according to claim 2, wherein
the first lip is provided with a first guide surface which inclines downward toward the second lip, and
the second lip is provided with a second guide surface which inclines downward toward the first lip.

4. The vehicle according to claim 2, wherein
the first lip covers a first upper surface of the lower support, the first upper surface being located on one side of the groove, and
the second lip covers a second upper surface of the lower support, the second upper surface being located on an opposite side of the groove.

5. The vehicle according to claim 1, wherein the anti-vibration member is constituted of a rubber material.

6. The vehicle according to claim 1, wherein the window frame is provided in the door.

7. The vehicle according to claim 1, wherein a pair of guide rails which slidably supports a pair of side edges of the window panel is provided inside the door.

8. The vehicle according to claim 1, wherein a knob configured to be gripped by a user is provided on the window panel.

9. The vehicle according to claim 8, wherein
the knob is provided with a movable hook configured to be manipulated by the user, and
the window frame is provided with a hook receiver configured to engage with the hook to lock the window panel when the window panel is located at the upper limit position.

10. The vehicle according to claim 1, wherein
the lower support comprises a first upper surface and a second upper surface each extending along a longitudinal direction of the groove, the groove being located between the first upper surface and the second upper surface and,
the anti-vibration member includes a first lip covering an entirety of the first upper surface of the lower support and a second lip covering an entirety of the second upper surface of the lower support.

11. The vehicle according to claim 10, wherein
the first lip of the anti-vibration member is located above the first upper surface of the lower support and apart from the first upper surface of the lower support, and
the second lip of the anti-vibration member is located above the second upper surface of the lower support and apart from the second upper surface of the lower support.

12. The vehicle according to claim 11, wherein
the first lip is provided with a first guide surface which inclines downward toward the second lip,
the second lip is provided with a second guide surface which inclines downward toward the first lip, and
the first guide surface and the second guide surface are arranged side-by-side above the groove such that the first guide surface and the second guide surface guide the lower edge of the window panel into the groove when the window panel moves toward the lower limit position.

13. The vehicle according to claim 12, wherein the first guide surface and the second guide surface are located above a plane which is parallel with the longitudinal direction of the groove and includes the first upper surface and the second upper surface of the lower support.

14. The vehicle according to claim 1, wherein the anti-vibration member includes a first lip and a second lip, the first lip being configured to abut one surface of the window panel when the window panel is located at the lower limit position and the second lip being configured to abut an opposite surface of the window panel when the window panel is located at the lower limit position, the first lip is provided with a first guide surface which inclines downward toward the second lip, the second lip is provided with a second guide surface which inclines downward toward the first lip, and the first guide surface and the second guide surface are arranged side-by-side above the groove such that the first guide surface and the second guide surface guide the lower edge of the window panel into the groove when the window panel moves to the lower limit position.

15. The vehicle according to claim 14, wherein the lower support comprises a first upper surface and a second upper surface each extending along a longitudinal direction of the groove, the groove being located between the first upper surface and the second upper surface, and the first guide surface and the second guide surface are located above a plane which is parallel with the longitudinal direction of the groove and includes the first upper surface and the second upper surface of the lower support.

* * * * *